United States Patent
Chamberlain et al.

(10) Patent No.: US 10,423,180 B2
(45) Date of Patent: *Sep. 24, 2019

(54) PROGRAMMABLE POWER SUPPLIES FOR CELLULAR BASE STATIONS AND RELATED METHODS OF REDUCING POWER LOSS IN CELLULAR SYSTEMS

(71) Applicant: CommScope Technologies LLC, Hickory, NC (US)

(72) Inventors: John Charles Chamberlain, Hickory, NC (US); Michael R Guerin, St Charles, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,573

(22) Filed: Feb. 17, 2018

(65) Prior Publication Data

US 2018/0176861 A1 Jun. 21, 2018

Related U.S. Application Data

(63) Continuation of application No. 15/497,021, filed on Apr. 25, 2017, which is a continuation of application (Continued)

(51) Int. Cl.
*G05F 1/62* (2006.01)
*H04B 3/54* (2006.01)
(Continued)

(52) U.S. Cl.
CPC ............ *G05F 1/62* (2013.01); *H04B 3/548* (2013.01); *H04M 19/008* (2013.01);
(Continued)

(58) Field of Classification Search
CPC ...... H04W 52/0206; G05F 1/62; H04B 3/548; H04M 19/008
(Continued)

(56) References Cited

U.S. PATENT DOCUMENTS

| 3,659,189 A | 4/1972 | Kiviranna |
| 4,745,562 A | 5/1988 | Prazdny |

(Continued)

FOREIGN PATENT DOCUMENTS

| CA | 2836133 A1 | 11/2012 |
| CN | 101848004 A | 9/2010 |

(Continued)

OTHER PUBLICATIONS

Chamberlain et al., "Programmable Power Supplies for Cellular Base Stations and Related Methods of Reducing Power Loss in Cellular Systems", "U.S. Appl. No. 61/940,631", filed Feb. 17, 2014, pp. 1-24, Published in: US.

(Continued)

*Primary Examiner* — Jinsong Hu
*Assistant Examiner* — Nicole Louis-Fils
(74) *Attorney, Agent, or Firm* — Fogg & Powers LLC

(57) ABSTRACT

Methods of powering a radio that is mounted on a tower of a cellular base station are provided in which a direct current ("DC") power signal is provided to the radio over a power cable and a voltage level of the output of the power supply is adjusted so as to provide a substantially constant voltage at a first end of the power cable that is remote from the power supply. Related cellular base stations and programmable power supplies are also provided.

28 Claims, 5 Drawing Sheets

Related U.S. Application Data

No. 15/226,977, filed on Aug. 3, 2016, which is a continuation of application No. 14/321,897, filed on Jul. 2, 2014, now Pat. No. 9,448,576.

(60) Provisional application No. 61/940,631, filed on Feb. 17, 2014.

(51) Int. Cl.
*H04M 19/00* (2006.01)
*H04W 52/00* (2009.01)
*H04W 52/02* (2009.01)

(52) U.S. Cl.
CPC ....... *H04W 52/00* (2013.01); *H04W 52/0206* (2013.01); *Y02D 70/00* (2018.01); *Y02D 70/144* (2018.01)

(58) Field of Classification Search
USPC ........................................................ 455/572
See application file for complete search history.

(56) References Cited

U.S. PATENT DOCUMENTS

| | | | |
|---|---|---|---|
| 5,073,977 A | 12/1991 | Kawahata | |
| 5,548,813 A | 8/1996 | Charas et al. | |
| 5,610,793 A | 3/1997 | Luu | |
| 6,095,867 A | 8/2000 | Brandt et al. | |
| 6,188,566 B1 | 2/2001 | Aoyama | |
| 6,640,111 B1 | 10/2003 | Shapira | |
| 6,813,510 B1* | 11/2004 | Kunzinger ........... H03G 3/3052 327/91 |
| 7,027,290 B1 | 4/2006 | Thrap | |
| 7,460,381 B2 | 12/2008 | Lanni | |
| 7,508,687 B2 | 3/2009 | Manolescu | |
| 7,739,522 B2 | 6/2010 | Festø et al. | |
| RE41,655 E | 9/2010 | Woodhead et al. | |
| 7,894,782 B2 | 2/2011 | Rofougaran | |
| 7,949,315 B2 | 5/2011 | Rofougaran | |
| 8,090,379 B2 | 1/2012 | Lambert et al. | |
| 8,401,497 B2 | 3/2013 | Rofougaran | |
| 8,401,501 B2 | 3/2013 | Rofougaran | |
| 8,412,385 B2 | 4/2013 | Brumett et al. | |
| 8,520,549 B2 | 8/2013 | Rofougaran | |
| 8,521,100 B2 | 8/2013 | Rofougaran | |
| 8,526,893 B2 | 9/2013 | Rofougaran | |
| 8,547,164 B2 | 10/2013 | Flores et al. | |
| 8,566,627 B2 | 10/2013 | Halepete et al. | |
| 8,577,359 B2 | 11/2013 | Wesby | |
| 8,600,318 B2 | 12/2013 | Rofougaran | |
| 8,754,622 B2 | 6/2014 | Dobkin et al. | |
| 8,848,766 B2 | 9/2014 | Lemson et al. | |
| 8,855,586 B2 | 10/2014 | Kenington | |
| 9,099,860 B2 | 8/2015 | Martinez et al. | |
| 9,425,614 B2 | 8/2016 | Xiong et al. | |
| 9,448,576 B2 | 9/2016 | Chamberlain et al. | |
| 10,025,335 B2 | 7/2018 | Chamberlain et al. | |
| 2003/0085621 A1 | 5/2003 | Potega | |
| 2004/0223346 A1 | 11/2004 | Rayner et al. | |
| 2006/0164108 A1 | 7/2006 | Herbold | |
| 2007/0024372 A1 | 2/2007 | Hagen | |
| 2007/0093204 A1 | 4/2007 | Kincard | |
| 2008/0172564 A1 | 7/2008 | Diab et al. | |
| 2008/0272654 A1 | 11/2008 | Lontka | |
| 2009/0215492 A1 | 8/2009 | Pistner et al. | |
| 2009/0258652 A1 | 10/2009 | Lambert et al. | |
| 2010/0181840 A1 | 7/2010 | Coulson et al. | |
| 2010/0237948 A1 | 9/2010 | Nguyen et al. | |
| 2010/0290787 A1 | 11/2010 | Cox | |
| 2011/0053632 A1 | 3/2011 | Liu | |
| 2011/0101937 A1 | 5/2011 | Dobkin et al. | |
| 2011/0159877 A1 | 6/2011 | Kenington et al. | |
| 2011/0237299 A1 | 9/2011 | Boss et al. | |
| 2012/0069882 A1* | 3/2012 | Nino ..................... H04W 24/02 375/222 |
| 2012/0155120 A1 | 6/2012 | Sugawara | |
| 2012/0269509 A1 | 10/2012 | Hultermans | |
| 2012/0317426 A1 | 12/2012 | Hunter et al. | |
| 2013/0051440 A1 | 2/2013 | Rofougaran | |
| 2013/0108227 A1 | 5/2013 | Conner | |
| 2013/0215804 A1 | 8/2013 | Lu et al. | |
| 2013/0260702 A1 | 10/2013 | Kenington | |
| 2013/0342949 A1 | 12/2013 | Xiong et al. | |
| 2014/0055898 A1 | 2/2014 | Kostakis et al. | |
| 2014/0132192 A1 | 5/2014 | Hernandez Marti et al. | |
| 2014/0168842 A1* | 6/2014 | Martinez ................ H02H 9/04 361/91.1 |
| 2014/0204497 A1 | 7/2014 | Sanchez et al. | |
| 2014/0372258 A1 | 12/2014 | Elberbaum | |
| 2015/0006095 A1 | 1/2015 | Voisine | |
| 2015/0015078 A1 | 1/2015 | Kim | |
| 2015/0080055 A1 | 3/2015 | Smentek et al. | |
| 2015/0168974 A1 | 6/2015 | Mascarenhas et al. | |
| 2015/0234399 A1 | 8/2015 | Chamberlain et al. | |
| 2015/0234405 A1 | 8/2015 | Chamberlain et al. | |
| 2015/0326317 A1 | 11/2015 | Michaelis et al. | |
| 2016/0191164 A1 | 6/2016 | Kim et al. | |
| 2016/0342168 A1 | 11/2016 | Chamberlain et al. | |
| 2017/0168513 A1 | 6/2017 | Chamberlain et al. | |
| 2017/0179817 A1 | 6/2017 | Gu | |
| 2017/0230906 A1 | 8/2017 | Chamberlain et al. | |
| 2018/0164355 A1 | 6/2018 | Winkler et al. | |
| 2018/0173263 A1 | 6/2018 | Chamberlain et al. | |
| 2018/0213091 A1 | 7/2018 | Kostakis et al. | |

FOREIGN PATENT DOCUMENTS

| | | |
|---|---|---|
| CN | 102439835 A | 5/2012 |
| CN | 102752885 A | 10/2012 |
| JP | H06163330 A | 6/1994 |
| KR | 1020110024543 | 3/2011 |
| KR | 1020100048227 | 12/2011 |
| KR | 1020100069332 | 4/2013 |
| WO | 2012083746 A1 | 6/2012 |
| WO | 20120159358 A1 | 11/2012 |
| WO | 2013147332 A1 | 10/2013 |
| WO | 2015042023 A1 | 3/2015 |

OTHER PUBLICATIONS

China Patent Office, "First Office Action for CN Application No. 201580007901.6, from Foreign Counterpart to U.S. Appl. No. 14/321,897", dated Nov. 27, 2017, pp. 1-12, Published in: CN.

Coleman et al, "Methods and Appartuses for Determing Cable Resistance", U.S. Appl. No. 15/908,147, filed Feb. 28, 2018, Feb. 28, 2018, pp. 1-35, Published in: U.S.

European Patent Office, "Extended European Search Report from EP Application No. 15748741.4, dated Jul. 6, 2017", "from Foreign Counterpart of U.S. Appl. No. 14/321,897", dated Jul. 6, 2017, pp. 1-7, Published in: EP.

European Patent Office, "Partial Supplementary European Search Report for EP14845872.2", "Foreign Counterpart to U.S. Appl. No. 14/321,897", dated Feb. 17, 2017, pp. 1-7, Published in: EP.

GE, "CP2000DC54-PE Compact Power Line DC/DC Converter", "www.ge.com/powerelectronics,", Aug. 20, 2013, pp. 1-15, Publisher: General Electric Company.

International Bureau, "International Preliminary Report on Patentability; from PCT Patent Application No. PCT/US2016/015085; dated Aug. 24, 2017", "from Foreign Counterpart of U.S. Appl. No. 14/619,211",dated Aug. 24, 2017, pp. 1-10, Published in: WO.

International Preliminary Examining Authority, "International Preliminary Report on Patentability for PCT/US2014/055800", "Foreign Counterpart to U.S. Appl. No. 14/487,329", dated Sep. 17, 2015, pp. 1-7, Published in: WO.

International Search Authority, "International Search Report and Written Opinion for PCT/US2015/013740", "Foreign Counterpart to U.S. Appl. No. 14/321,897", dated Apr. 28, 2015, pp. 1-17, Published in: WO.

International Search Authority, "International Search Report and Written Opinion for PCT/US2016/022575", "From U.S. Appl. No. 14/321,897", dated Aug. 17, 2016, pp. 1-14, Published in: WO.

(56) References Cited

OTHER PUBLICATIONS

International Search Authority, International Search Report and Written Opinion for PCT Application No. PCT/US2014/055800, "Foreign Counterpart to U.S. Appl. No. 14/321,897", dated Dec. 18, 2014, pp. 1-12, Published in: WO.
International Searching Authority, "International Preliminary Report on Patentability for PCT Application No. PCT/US2016/022575", Foreign Counterpart to U.S. Appl. No. 14/321,897 dated Nov. 7, 2017, pp. 1-8, Published in: WO.
International Searching Authority, "Invitation to Pay Additional Fees and, where Applicable, Protest Fee for PCT Application No. PCT/US2016/022575", "Foreign Counterpart to U.S. Appl. No. 14/321,897", dated Jun. 23, 2016, pp. 1-7, Published in: WO.
International Searching Authority, "Preliminary Report on Patentability for PCT/US2015/013740", "Foreign Counterpart to U.S. Appl. No. 14/321,897", dated Sep. 1, 2016, pp. 1-14, Published in: WO.
International Searching Authority, "The International Search Report and The Written Opinion of the International Search Authority for PCT/US2016/015085", "Foreign Counterpart to U.S. Appl. No. 14/321,897", dated May 12, 2016, pp. 1-14, Published in: WO.
Keithley, "Single-Channel Programmable DC Power Supplies", "Series 2200, www.keithley.com", , pp. 1-4, Publisher: A Tektronix Company.
McGill et al., "High-Resolution Alignment of Sampled Waveforms," IEEE Transactions on Biomedical Engineering, vol. BME-31, No. 6, Jun. 1984, pp. 462-468.
State Intellectual Property Office of the People's Republic of China, "Third Office Action for CN Application No. 201480051376.3, Foreign Counterpart to U.S. Appl. No. 14/487,329", dated Dec. 11, 2017, pp. 1-24, Published in: CN.
United States Patent and Trademark Office, "Corrected Notice of Allowability", "From U.S. Appl. No. 14/321,897", dated Aug. 11, 2016, pp. 1-2, Published in: US.
United States Patent and Trademark Office, "Final Office Action", "From U.S. Application No. 14/321,897", dated Mar. 23, 2016, pp. 126, Published in: US.
United States Patent and Trademark Office, "Final Office Action", "from U.S. Appl. No. 14/701,904", dated Sep. 7, 2017, pp. 1-23, Published in: U.S.
United States Patent and Trademark Office, "Final Office Action", "from U.S. Appl. No. 15/226,977", dated Aug. 22, 2017, pp. 1-23, Published in: US.
United States Patent and Trademark Office, "Notice of Allowance", "From U.S. Appl. No. 14/321,897", dated Jul. 28, 2016, pp. 1-10, Published in: US.
United States Patent and Trademark Office, "Office Action for U.S. Appl. No. 15/497,021", dated Jan. 31, 2018, pp. 1-39, Published in: U.S.
United States Patent and Trademark Office, "Office Action for U.S. Appl. No. 14/701,904", dated Feb. 8, 2018, pp. 1-22, Published in: U.S.
United States Patent and Trademark Office, "Office Action", "From U.S. Appl. No. 14/321,897", dated Nov. 5, 2015, pp. 1-25, Published in: US.
United States Patent and Trademark Office, "Office Action", "From U.S. Appl. No. 14/701,904", dated Mar. 7, 2017, pp. 1-18, Published in: US.
United States Patent and Trademark Office, "Office Action", "From U.S. Appl. No. 15/226,977", dated Mar. 20, 2017, pp. 1-35, Published in: US.
Williams et al., "2-Wire Virtual Remote Sensing for Voltage Regulators—Clairvoyance Marries Remote Sensing", "Application Note 126, www.linear.com", Oct. 2010, pp. AN126-1-AN126-22, Publisher: Linear Technology.
European Patent Office, "Extended European Search Report from EP Application No. 16749587.8 dated Dec. 3, 2018", from Foreign Counterpart to PCT Application No. PCT/US2016/015085, dated Dec. 3, 2018, pp. 1-11, Published: EP.

European Patent Office, "Partial Supplementary European Search Report from EP Application No. 16749587.8 dated Aug. 30, 2018", from Foreign Counterpart to PCT Application No. PCT/US2016/015085, dated Aug. 30, 2018, pp. 1-12, Published: EP.
International Bureau, "International Preliminary Report on Patentability from PCT Application No. PCT/US2016/022575 dated Nov. 16, 2017", from Foreign Counterpart to U.S. Appl. No. 14/701,904, dated Nov. 16, 2017, pp. 1-9, Published: WO.
International Searching Authority, "International Search Report and Written Opinion from PCT Application No. PCT/US2018/017276 dated May 28, 2018", from Foreign Counterpart to U.S. Appl. No. 14/321,897, dated May 28, 2018, pp. 1-16, Published in: KR.
State Intellectual Property Office, P.R. China, "Office Action from CN Application No. 201480051376.3 dated Jan. 4, 2017", from Foreign Counterpart to U.S. Appl. No. 14/321,897, dated Jan. 4, 2017, pp. 1-15, Published: CN.
U.S. Patent and Trademark Office, "Advisory Action", U.S. Appl. No. 15/497,021, dated Nov. 5, 2018, pp. 1-7, Published: US.
U.S. Patent and Trademark Office, "Corrected Notice of Allowability" U.S. Appl. No. 14/487,329, dated Jan. 20, 2016, pp. 1-2, Published: US.
U.S. Patent and Trademark Office, "Final Office Action" U.S. Appl. No. 14/619,211, dated Jun. 1, 2016, pp. 1-16, Published: US.
U.S. Patent and Trademark Office, "Final Office Action", U.S. Appl. No. 15/497,021, dated Jul. 16, 2018, pp. 1-28, Published: US.
U.S. Patent and Trademark Office, "Final Office Action", U.S. Appl. No. 15/898,809, dated Nov. 20, 2018, pp. 1-19, Published: US.
U.S. Patent and Trademark Office, "Notice of Allowability", U.S. Appl. No. 14/619,211, dated Aug. 7, 2017, pp. 1-2, Published: US.
U.S. Patent and Trademark Office, "Notice of Allowability", U.S. Appl. No. 15/226,977, dated Jun. 8, 2018, pp. 1-4, Published: US.
U.S. Patent and Trademark Office, "Notice of Allowability", U.S. Appl. No. 15/671,226, dated Jan. 9, 2018, pp. 1-4, Published: US.
U.S. Patent and Trademark Office, "Notice of Allowance", U.S. Appl. No. 14/487,329, dated Dec. 14, 2015, pp. 1-5, Published: US.
U.S. Patent and Trademark Office, "Notice of Allowance", U.S. Appl. No. 14/619,211, dated Dec. 30, 2016, pp. 1-5, Published: US.
U.S. Patent and Trademark Office, "Notice of Allowance", U.S. Appl. No. 14/619,211, dated Apr. 20, 2017, pp. 1-5, Published: US.
U.S. Patent and Trademark Office, "Notice of Allowance", U.S. Appl. No. 14/701,904, dated Oct. 20, 2018, pp. 1-15, Published: US.
U.S. Patent and Trademark Office, "Notice of Allowance", U.S. Appl. No. 14/701,904, dated Dec. 28, 2018, pp. 1-16, Published: US.
U.S. Patent and Trademark Office, "Notice of Allowance", U.S. Appl. No. 15/226,977, dated Apr. 6, 2018, pp. 1-14, Published: US.
U.S. Patent and Trademark Office, "Notice of Allowance", U.S. Appl. No. 15/226,977, dated May 25, 2018, pp. 1-10, Published: US.
U.S. Patent and Trademark Office, "Notice of Allowance", U.S. Appl. No. 15/497,021, dated Feb. 4, 2019, pp. 1-7, Published: US.
U.S. Patent and Trademark Office, "Notice of Allowance", U.S. Appl. No. 15/671,226, dated Mar. 23, 2018, pp. 1-6, Published: US.
U.S. Patent and Trademark Office, "Notice of Allowance", U.S. Appl. No. 15/671,226, dated Dec. 15, 2017, pp. 1-16, Published: US.
U.S. Patent and Trademark Office, "Notice of Allowance", U.S. Appl. No. 15/971,302, dated Feb. 1, 2019, pp. 1-8, Published: US.
U.S. Patent and Trademark Office, "Notice of Allowance", U.S. Appl. No. 15/971,302, dated Dec. 14, 2018, pp. 1-15, Published: US.
U.S. Patent and Trademark Office, "Office Action", U.S. Appl. No. 14/487,329, dated Aug. 12, 2015, pp. 1-12, Published: US.
U.S. Patent and Trademark Office, "Office Action", U.S. Appl. No. 14/619,211, dated Dec. 3, 2015, pp. 1-13, Published: US.
U.S. Patent and Trademark Office, "Office Action", U.S. Appl. No. 15/898,809, dated May 9, 2018, pp. 1-29, Published: US.
U.S. Patent and Trademark Office, "Office Action", U.S. Appl. No. 15/939,973, dated Nov. 14, 2018, pp. 1-19, Published: US.
U.S. Patent and Trademark Office, "Notice of Allowance", U.S. Appl. No. 15/497,021, dated Mar. 14, 2019, pp. 1-14, Published: US.

(56) References Cited

OTHER PUBLICATIONS

European Patent Office, "Communication pursuant to Article 94(3) from EP Applicaiton No. 15748741.4 dated Jun. 27, 2019", from Foreign Counterpart to U.S. Appl. No. 14/321,897, pp. 1-5, Published: EP.

U.S. Patent and Trademark Office, "Office Action", U.S. Appl. No. 15/891,194, dated Jun. 24, 2019, pp. 1-62, Published: US.

U.S. Patent and Trademark Office, "Office Action", U.S. Appl. No. 16/163,958, dated Jun. 25, 2019, pp. 1-78, Published: US.

U.S. Patent and Trademark Office, "Office Action", U.S. Appl. No. 16/380,921, Jun. 26, 2019, pp. 1-56, Published: US.

* cited by examiner

PROGRAMMABLE POWER SUPPLIES FOR CELLULAR BASE STATIONS AND RELATED METHODS OF REDUCING POWER LOSS IN CELLULAR SYSTEMS

CROSS-REFERENCE TO RELATED APPLICATION

The present application claims priority under 35 U.S.C. § 120 as a continuation of U.S. patent application Ser. No. 15/497,021 filed on Apr. 25, 2017 which in turn claims priority under 35 U.S.C. § 120 as a continuation of U.S. patent application Ser. No. 15/226,977 filed on Aug. 3, 2016 which in turn claims priority under 35 U.S.C. § 120 as a continuation of Ser. No. 14/321,897, filed Jul. 2, 2014 which in turn claims benefit under 35 U.S.C. § 119 of U.S. Provisional Patent Application Ser. No. 61/940,631, filed Feb. 17, 2014, the entire contents of which is incorporated herein by reference as if set forth in its entirety.

FIELD OF THE INVENTION

The present invention relates generally to cellular communications systems and, more particularly, to power supplies for cellular base stations that may exhibit reduced power loss.

BACKGROUND

Cellular base stations typically include, among other things, a radio, a baseband unit, and one or more antennas. The radio receives digital information and control signals from the baseband unit and modulates this information into a radio frequency ("RF") signal that is then transmitted through the antennas. The radio also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the radio. A power supply may also be provided that generates suitable direct current ("DC") power signals for powering the baseband unit and the radio. For example, the radio is often powered by a (nominal) 48 Volt DC power supply in cellular systems that are currently in use today. A battery backup is also typically provided to maintain service for some period of time during power outages.

In order to increase coverage and signal quality, the antennas in many cellular base stations are located at the top of a tower, which may be, for example, about fifty to two hundred feet tall. Until fairly recently, the power supply, baseband unit and radio were all located in an equipment enclosure at the bottom of the tower to provide easy access for maintenance, repair and/or later upgrades to the equipment. Coaxial cable(s) were routed from the equipment enclosure to the top of the tower that carried signal transmissions between the radio and the antennas.

FIG. 1 schematically illustrates a conventional cellular base station 10. As shown in FIG. 1, the cellular base station 10 includes an equipment enclosure 20 and a tower 30. The equipment enclosure 20 is typically located at the base of the tower 30, as shown in FIG. 1. A baseband unit 22, a radio 24 and a power supply 26 are located within the equipment enclosure 20. The baseband unit 22 may be in communication with a backhaul communications system 44. A plurality of antennas 32 (e.g., three sectorized antennas 32-1, 32-2, 32-3) are located at the top of the tower 30. Three coaxial cables 34 (which are bundled together in FIG. 1 to appear as a single cable) connect the radio 24 to the antennas 32. The antennas 32 are passive (unpowered) devices and hence none of the equipment at the top of the tower 30 require electrical power. Note that herein when multiple units of an element are provided, each individual unit may be referred to individually by the reference numeral for the element followed by a dash and the number for the individual unit (e.g., antenna 32-2), while multiple units of the element may be referred to collectively by their base reference numeral (e.g., the antennas 32).

In recent years, a shift has occurred and the radio 24 is now more typically located at the top of the tower 30 in new or upgraded cellular installations. Radios that are located at the top of the tower 30 are typically referred to as remote radio heads ("RRH") 24'. Using RRHs 24' may significantly improve the quality of the cellular data signals that are transmitted and received by the cellular base station as the use of RRHs 24' may reduce signal transmission losses and noise. In particular, as the coaxial cable runs up the tower may be 100-200 feet or more, the signal loss that occurs in transmitting signals at cellular frequencies (e.g., 1.8 GHz, 3.0 GHz, etc.) over the coaxial cable may be significant. Because of this loss in signal power, the signal-to-noise ratio of the RF signals may be degraded in systems that locate the radio 24 at the bottom of the tower 30 as compared to cellular base stations where RRHs 24' are located at the top of the tower 30 next to the antennas 32 (note that signal losses in the cabling connection between the baseband unit 22 at the bottom of the tower 30 and the RRH 24' at the top of the tower 30 may be much smaller, as these signals are transmitted at baseband frequencies as opposed to RF frequencies).

FIG. 2 is a schematic diagram that illustrates a cellular base station 10' according to this newer architecture. As shown in FIG. 2, the baseband unit 22 and the power supply 26 may still be located at the bottom of the tower 30 in the equipment enclosure 20. The radio 24 in the form of an RRH 24' is located at the top of the tower 30 immediately adjacent to the antennas 32. While the use of tower-mounted RRHs 24' may improve signal quality, it also, unfortunately, requires that DC power be delivered to the top of the tower 30 to power the RRH 24'. In some cases, the DC power may be delivered over a coaxial cable (not shown) that also carries communications between the baseband unit 22 and the RRH 24'. As shown in FIG. 2, more typically a fiber optic cable 38 connects the baseband unit 22 to the RRH 24' (as fiber optic links may provide greater bandwidth and lower loss transmissions), and a separate power cable 36 is provided for delivering the DC power signal to the RRH 24'. The separate power cable 36 is typically bundled with the fiber optic cable 38 so that they may be routed up the tower 30 together.

SUMMARY

Pursuant to embodiments of the present invention, methods of powering a radio that is mounted on a tower of a cellular base station (or other location remote from an associated baseband unit) are provided in which a DC power signal is output from a power supply and the DC power signal that is output from the power supply is supplied to the radio over a power cable. A voltage level of the DC power signal that is output from the power supply is adjusted so that the DC power signal at a radio end of the power cable that is remote from the power supply has a substantially constant voltage notwithstanding variation in a current level of the DC power signal.

In some embodiments, the power supply may be a programmable power supply, and the method may further include inputting information to the power supply from which the voltage level of the DC power signal that is output from the power supply can be computed that will provide the DC power signal at the radio end of the power cable that has the substantially constant voltage. In such embodiments, the information that is input to the power supply may be a resistance of the power cable, or may be a length of the power cable and a diameter of the conductive core of the power cable.

In some embodiments, a current level of the DC power signal that is output from the power supply may be measured, and the voltage level of the DC power signal that is output by the power supply may be automatically adjusted in response to changes in the measured output current of the DC power signal that is output from the power supply to provide the DC power signal at the radio end of the power cable that has the substantially constant voltage.

In some embodiments, the programmable power supply may be a DC-to-DC converter that receives a DC power signal that is output from a second power supply and adjusts a voltage level of the DC power signal that is output from the second power supply to provide the DC power signal at the radio end of the power cable that has the substantially constant voltage. The substantially constant voltage may be a voltage that exceeds a nominal power signal voltage of the radio and which is less than a maximum power signal voltage of the radio.

In some embodiments, a signal may be transmitted over the power cable that is used to determine an electrical resistance of the power cable. In some embodiments, the substantially constant voltage may be significantly higher than a maximum power signal voltage of the radio, and a tower-mounted DC-to-DC converter may be used to reduce a voltage of the power signal at the radio end of the power cable to a voltage that is less than the maximum power supply voltage of the radio.

Pursuant to further embodiments of the present invention, cellular base station systems are provided that include a tower with at least one antenna mounted thereon, an RRH mounted on the tower, a baseband unit that is in communication with the RRH, a programmable power supply located remotely from the RRH; and a power cable having a first end that receives a DC power signal from the programmable power supply and a second end that provides the DC power signal to the RRH. The programmable power supply is configured to provide a substantially constant voltage at the second end of the power cable by adjusting a voltage level of the DC power signal output by the programmable power supply based on the current level output by the programmable power supply and a resistance of the power cable.

In some embodiments, the programmable power supply may include a user interface that is configured to receive a resistance of the power cable and/or information regarding characteristics of the power cable from which the resistance of the power cable may be calculated. The programmable power supply may further include a current measurement module that measures a current output by the power supply. The programmable power supply may also include a feedback loop that adjusts the voltage level of the DC power signal output of the power supply based on the measured current output by the power supply.

Pursuant to still further embodiments of the present invention, programmable power supplies are provided that include an input; a conversion circuit that is configured to convert an input signal into a DC output signal that is output through an output port; a current sensor that senses an amount of current output through the output port; a user input that is configured to receive information relating to the resistance of a cabling connection between the programmable power supply output port and a radio; and a control module that is configured to control the conversion circuit in response to information relating to the resistance of the cabling connection and the sensed amount of current to adjust the voltage of the output signal that is output through the output port so that the voltage at the far end of the cabling connection may remain substantially constant despite changes in the current drawn by the radio.

In some embodiments, the information relating to the resistance of the cabling connection may comprise a length of the cabling connection and a size of the conductor of the cabling connection.

Pursuant to additional embodiments of the present invention, methods of powering a cellular radio that is located remotely from a power supply and an associated baseband unit and that is connected to the power supply by a cabling connection are provided in which a DC power signal is output from the power supply and the DC power signal that is output from the power supply is supplied to the radio over the cabling connection. A voltage level of the DC power signal that is output from the power supply is adjusted in response to a current level of the DC power signal that is output from the power supply so that the voltage of the DC power signal at a radio end of the cabling connection is maintained at a pre-selected level, range or pattern.

In some embodiments, the voltage level of the DC power signal that is output from the power supply is adjusted in response to a feedback signal that is transmitted to the power supply from a remote location. The feedback signal may include information regarding the measured voltage of the DC power signal at the radio end of the power cable.

Pursuant to yet additional embodiments of the present invention, methods of powering a radio that is mounted on a tower of a cellular base station (or other location remote from an associated baseband unit) are provided in which a DC power signal is output from a power supply and the DC power signal that is output from the power supply is supplied to the radio over a power cable. A voltage of the DC power signal is measured at a radio end of the power cable that is remote from the power supply. Information regarding the measured voltage of the DC power signal at the radio end of the power cable is communicated to the power supply. A voltage level of the DC power signal that is output from the power supply is adjusted in response to the received information regarding the measured voltage of the DC power signal at the radio end of the power cable.

In some embodiments, the the voltage level of the DC power signal that is output from the power supply may be adjusted in response to the received information to maintain the DC power signal at the radio end of the power cable at a substantially constant voltage notwithstanding variation in a current level of the DC power signal In one embodiment, a method is provided. The method comprises measuring a voltage on a power cable proximate to a remote radio head coupled to the power cable; and transmitting the measured voltage to affect an adjustment to an output voltage of a programmable power supply coupled to the power cable.

DETAILED DESCRIPTION

Figure 1:
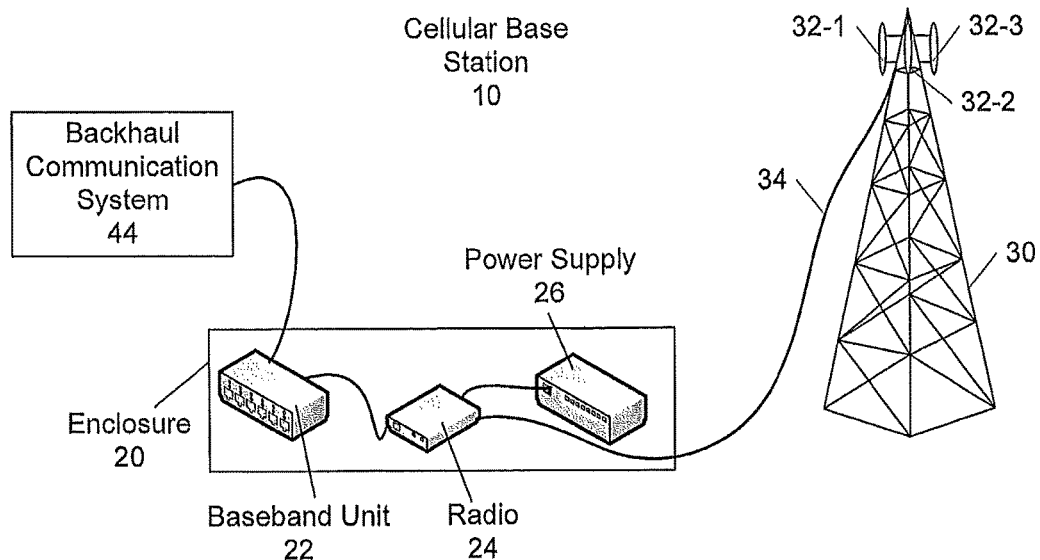
FIG. 1 is a simplified, schematic view of a traditional cellular base station architecture.
Figure 2:
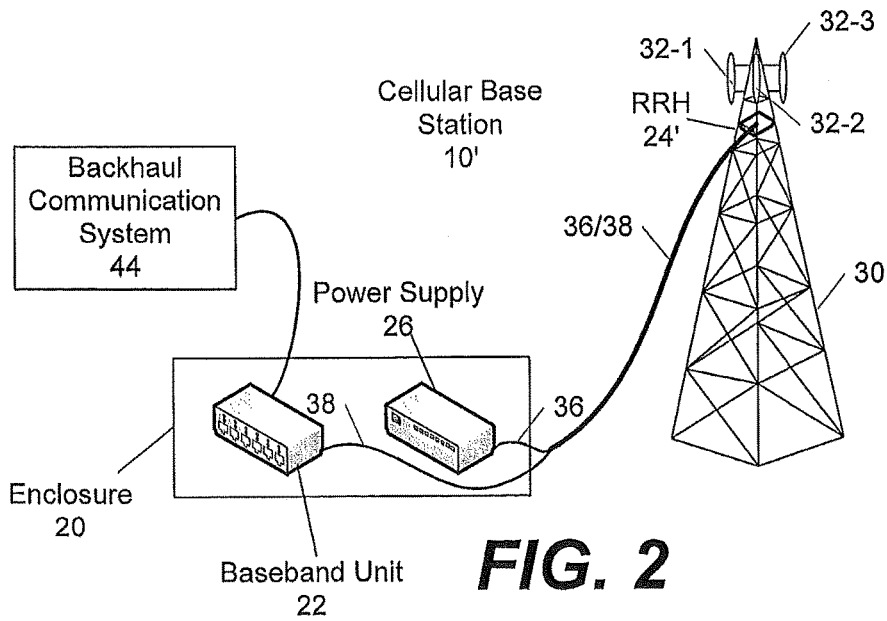
FIG. 2 is a simplified, schematic view of a conventional cellular base station in which a remote radio head is located at the top of the antenna tower.

Pursuant to embodiments of the present invention, methods for delivering DC power to a remote radio head ("RRH") of a cellular base station are provided, along with related cellular base stations and programmable power supplies. These methods, systems and power supplies may allow for lower power supply currents, which may reduce the power loss associated with delivering the DC power signal from the power supply at the base of a tower of the cellular base station to the RRH at the top of the tower. Since cellular towers may be hundreds of feet tall and the voltage and currents required to power the RRH may be quite high (e.g., about 50 Volts at about 20 Amperes of current), the power loss that may occur along the hundreds of feet of cabling may be significant. Thus, the methods according to embodiments of the present invention may provide significant power savings which may reduce the costs of operating a cellular base station.

The DC voltage of a power signal that is supplied to an RRH from a power supply over a power cable may be determined as follows:

$$V_{RRH} = V_{PS} - V_{Drop} \quad (1)$$

where $V_{RRH}$ is the DC voltage of the power signal delivered to the RRH, $V_{PS}$ is the DC voltage of the power signal that is output by the power supply, and $V_{Drop}$ is the decrease in the DC voltage that occurs as the DC power signal traverses the power cable connecting the power supply to the RRH. $V_{Drop}$ may be determined according to Ohm's Law as follows:

$$V_{Drop} = I_{RRH} * R_{Cable} \quad (2)$$

where $R_{Cable}$ is the cumulative electrical resistance (in Ohms) of the power cable connecting the power supply to the RRH and $I_{RRH}$ is the average current (in Amperes) flowing through the power cable to the RRH.

The electrical resistance $R_{Cable}$ of the power cable is inversely proportional to the diameter of the conductor of the power cable (assuming a conductor having a circular cross-section). Thus, the larger the diameter of the conductor (i.e., the lower the gauge of the conductor), the lower the resistance of the power cable. Typically, power cables utilize copper conductors due to the low resistance of copper. Copper resistance is specified in terms of unit length, typically milliohms (mΩ)/ft; as such, the cumulative electrical resistance of the power cable increases with the length of the cable. Thus, the longer the power cable, the higher the voltage drop $V_{Drop}$.

Typically, a minimum required voltage for the power signal, a nominal or recommended voltage for the power signal and a maximum voltage for the power signal will be specified for the RRH. Thus, the power supply at the base of the tower must output a voltage $V_{PS}$ such that $V_{RRH}$ will be between the minimum and maximum specified voltages for the power signal of the RRH. As $V_{Drop}$ is a function of the current $I_{RRH}$ that is supplied to the RRH (see Equation 2 above), if $V_{PS}$ (the voltage output by the power supply) is constant, then the voltage $V_{RRH}$ of the power signal that is delivered to the RRH will change with the variation in current drawn by the RRH. Conventionally, the voltage output by the power supply ($V_{PS}$) is set to ensure that a power signal having the nominal voltage is supplied to the RRH (or at least a value above the minimum required voltage for the power signal) when the RRH draws the maximum anticipated amount of current.

The power that is lost ($P_{Loss}$) in delivering the power signal to the RRH over a power cable may be calculated as follows:

$$P_{Loss} = V_{Cable} * I_{RRH} = (I_{RRH} * R_{Cable}) * I_{RRH} = I_{RRH}^2 * R_{Cable} \quad (3)$$

where $V_{Cable}$ = the average voltage drop in Volts along the power cable. In order to reduce or minimize $P_{Loss}$, the power supply may be set to output a DC power signal that, when it arrives at the RRH, will have the maximum voltage specified for the RRH, as the higher the voltage of the power signal that is delivered to the RRH the lower the current $I_{RRH}$ of the power signal on the power cable. As is apparent from Equation 3 above, the lower the current $I_{RRH}$ of the power signal on the power cable, the lower the power loss $P_{Loss}$.

Pursuant to embodiments of the present invention, the power supply may comprise a programmable power supply which may (1) sense the current being drawn by the RRH (or another equivalent parameter) and (2) adjust the voltage of the power signal that is output by the power supply to substantially maintain the voltage of the power signal that is supplied to the RRH at or near a desired value, which may be, for example, the maximum voltage for the power signal that may be input to the RRH. In order to accomplish this, the resistance of the power cable may be input to the programmable power supply or, alternatively, other information such as, for example, the length and size of the power cable, or the impedance of the power cable, may be input to the programmable power supply and the programmable power supply may determine the resistance of the power cable from this information. As the current drawn by the RRH varies, the programmable power supply may adjust the voltage of its output power signal to a voltage level that will deliver a power signal having a preselected voltage (e.g., the maximum supply voltage of the RRH minus a buffer) to the RRH. As shown by Equation 3 above, this will reduce or minimize the power loss along the power cable, and hence may reduce the cost of powering the RRH. As a typical RRH may require about a kilowatt of power and may run 24 hours a day, seven days a week, and as a large number of RRHs may be provided at each cellular base station (e.g., three to twelve), the power savings may be significant.

Embodiments of the present invention will now be discussed in more detail with reference to FIGS. 3-7, in which example embodiments of the present invention are shown.

Figure 3:
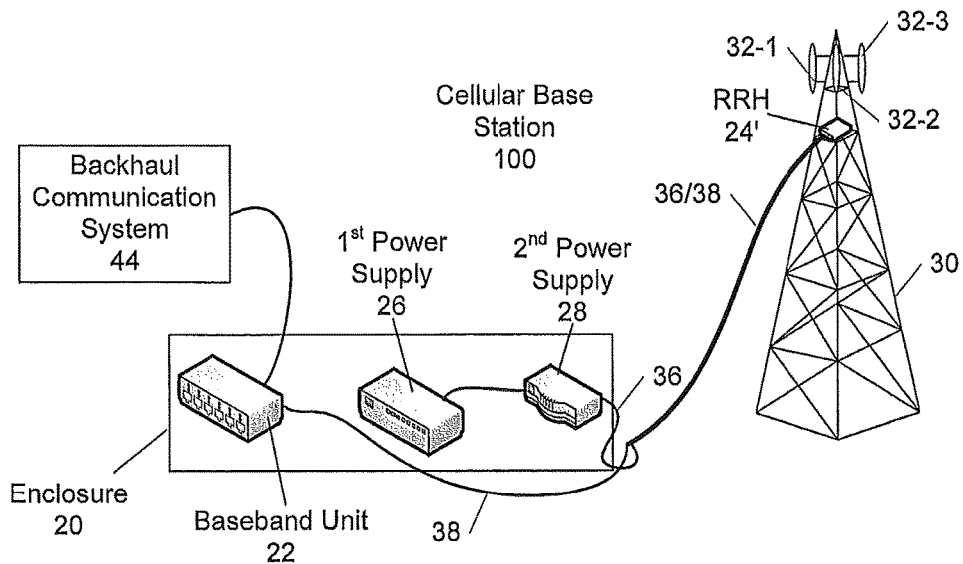
FIG. 3 is a simplified, schematic view of a cellular base station according to embodiments of the present invention.

FIG. 3 is a schematic block diagram of a cellular base station 100 according to embodiments of the present invention. As shown in FIG. 3, the cellular base station 100 includes an equipment enclosure 20 and a tower 30. The tower 30 may be a conventional antenna or cellular tower or may be another structure such as a utility pole or the like. A baseband unit 22, a first power supply 26 and a second power supply 28 are located within the equipment enclosure 20. An RRH 24' and plurality of antennas 32 (e.g., three sectorized antennas 32-1, 32-2, 32-3) are mounted on the tower 30, typically near the top thereof.

The RRH 24' receives digital information and control signals from the baseband unit 22 over a fiber optic cable 38 that is routed from the enclosure 20 to the top of the tower 30. The RRH 24' modulates this information into a radio frequency ("RF") signal at the appropriate cellular frequency that is then transmitted through one or more of the antennas 32. The RRH 24' also receives RF signals from one or more of the antennas 32, demodulates these signals, and supplies the demodulated signals to the baseband unit 22 over the fiber optic cable 38. The baseband unit 22 processes the demodulated signals received from the RRH 24' and forwards the processed signals to the backhaul communications system 44. The baseband unit 22 also processes signals received from the backhaul communications system 44 and supplies them to the RRH 24'. Typically, the baseband unit 22 and the RRHs 24 each include optical-to-electrical and electrical-to-optical converters that couple the digital information and control signals to and from the fiber optic cable 38.

The first power supply 26 generates one or more direct current ("DC") power signals. The second power supply 28 in the embodiment of FIG. 3 comprises a DC-to-DC converter that accepts the DC power signal output by the first power supply 26 as an input and outputs a DC power signal having a different voltage. A power cable 36 is connected to the output of the second power supply 28 and is bundled together with the fiber optic cable 38 so that the two cables 36, 38 may be routed up the tower 30 as an integral unit. While the first power supply 26 and the second power supply 28 are illustrated as separate power supply units in the embodiment of FIG. 3, it will be appreciated that the two power supplies 26, 28 may be combined into a single power supply unit in other embodiments.

As noted above, pursuant to embodiments of the present invention, DC power supplies are provided that may deliver a power signal to a remote RRH with reduced power loss. In the embodiment of FIG. 3, the power supply 28 comprises a programmable power supply that receives an input DC power signal from power supply 26 and outputs a DC power signal to the power cable 36. The voltage of the DC power signal output by the power supply 28 may vary in response to variations in the current of the DC power signal drawn from the power supply 28 by the RRH 24'. In particular, the voltage of the DC power signal output by the power supply 28 may be set so that the voltage of the DC power signal at the far end of the power cable 36 (i.e., the end adjacent the RRH 24') is relatively constant. If the voltage of the DC power signal at the far end of power cable 36 is set to be approximately the maximum specified voltage for the power signal of the RRH 24', then the power loss associated with supplying the DC power signal to the RRH 24' over the power cable 36 may be reduced, since the higher DC power signal voltage will correspondingly reduce the current of the DC power signal that is supplied over the power cable 36.

State-of-the-art RRHs are most typically designed to be powered by a 48 Volt (nominal) DC power signal. While the minimum DC power signal voltage at which the RRH 24' will operate and the maximum DC power signal voltage that may be provided safely to the RRH 24' without the threat of damage to the RRH 24' vary, typical values are a 38 Volt minimum DC power signal voltage and a 56 Volt maximum DC power signal voltage. Thus, according to embodiments of the present invention, the programmable power supply 28 may be designed to deliver a DC power signal having a relatively constant voltage of, for example, about 54 or 52 Volts at the far end of the power cable 36 (i.e., about, 2-4 Volts less than the maximum DC power signal voltage for the RRH 24') in order to reduce the power loss associated with the voltage drop that the DC power signal experiences traversing the power cable 36.

In order to maintain the voltage of the DC power signal at the far end of the power cable 36 at or near a predetermined value it may be necessary to know two things. First, the current of the DC power signal drawn from the power supply must be known, as Equations 1 and 2 show that $V_{RRH}$ is a function of $I_{RRH}$. Second, the resistance $R_{Cable}$ of the power cable 36 must also be known, as it too affects the voltage drop. The programmable power supplies according to embodiments of the present invention may be configured to measure, estimate, calculate or receive both values.

Figure 4:
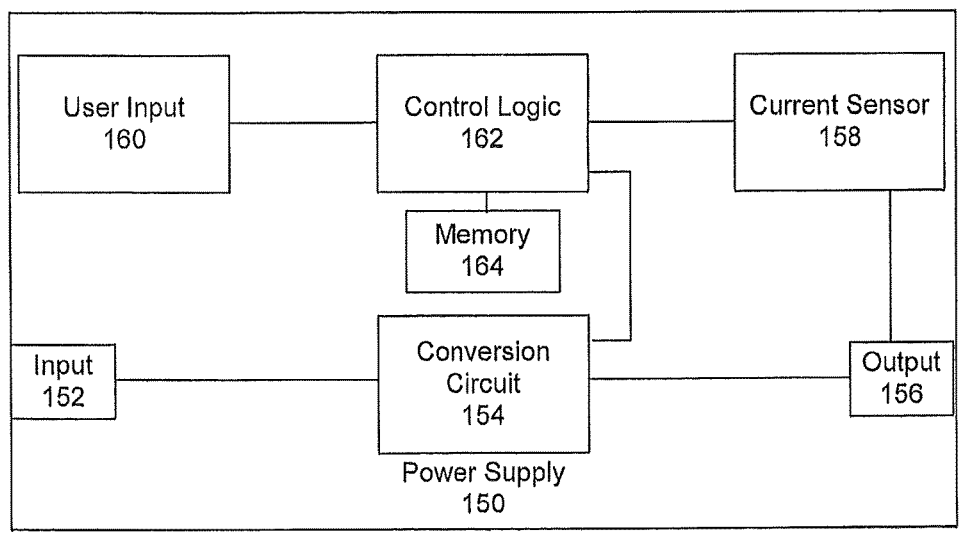
FIG. 4 is a schematic block diagram of a programmable power supply according to embodiments of the present invention.

For example, FIG. 4 is a block diagram of a programmable power supply 150 in the form of a DC-to-DC converter according to certain embodiments of the present invention that may be used as the power supply 28 of FIG. 3. As shown in FIG. 4, the programmable power supply 150 includes an input 152, a conversion circuit 154 and an output 156. The power supply 150 further includes a current sensor 158, a user input 160, control logic 162 and a memory 164.

The input 152 may receive a DC power signal such as the DC power signal output by power supply 26 of FIG. 3. The DC power signal that is received at input 152 may be a DC power signal having a relatively constant voltage in some embodiments. The conversion circuit 154 may be a circuit that is configured to convert the voltage of the signal received at input 152 to a different DC voltage. A wide variety of DC conversion circuits are known in the art, including, for example, electronic, electrochemical and electromechanical conversion circuits. Most typically electronic circuits using inductors or transformers are used to provide high efficiency voltage conversion. The output 156 may output the DC power signal having the converted voltage.

The current sensor 158 may be any appropriate circuit that senses the current level of the DC power signal output through the output 156. The current drawn by the RRH 24' may vary over time depending upon, for example, the number of carriers that are transmitting at any given time and whether the RRH is in a steady-state mode, powering up or rebooting. The current sensor 158 may sense the current level of the DC power signal at output 156 and provide the sensed current level to the control logic 162. The control logic 162 may then adjust parameters of the conversion circuit 154 so as to adjust the voltage of the DC power signal output through output 156 so that the voltage at the far end of the power cable 36 that is attached to output 156 may remain substantially constant despite changes in the current drawn by the RRH 24' and corresponding changes in the voltage drop that occurs over the power cable 36.

While FIG. 4 illustrates a power supply 150 that comprises a DC-to-DC converter, it will be appreciated that in other embodiments an AC-to-DC converter may be used instead. In such embodiments, the input 152 receives an alternating current ("AC") power signal and the conversion circuit 154 converts the AC power signal to a DC power signal and also adjusts the voltage level of the DC power signal that is output through output 156 to an appropriate level in the manner discussed above.

As noted above, in some embodiments, the voltage of the power signal that is output by the power supply 150 may be set so that the voltage at the far end of the power cable 36 remains at or near a predetermined voltage level that is just under a maximum power signal voltage level that the RRH 24' may handle. In order to achieve this, it is necessary to know the voltage drop that the DC power signal will experience traversing the power cable 36, as this voltage drop affects the voltage of the DC power signal at the far end of the power cable 36. In some embodiments, the user input 160 to the power supply 150 allows a user to input a cumulative resistance value for the power cable 36 which the user may obtain by, for example, calculation (based on the length, size and material of the conductor of the power cable 36), measurement (done, for example, by transmitting a signal over the power cable 36 and measuring the voltage of the signal output at the far end of the power cable 36) or a combination thereof (e.g., measuring or estimating a cumulative impedance value for the power cable 36 and converting this cumulative impedance value into a cumulative resistance value). In other embodiments, the user may input physical characteristics of the power cable 36 such as size, length, conductor material, model number, etc.) and algorithms, equations, look-up tables and the like that are stored in the memory 164 of the power supply 150 may be used to calculate or estimate the resistance of the power cable 36.

Figure 5:
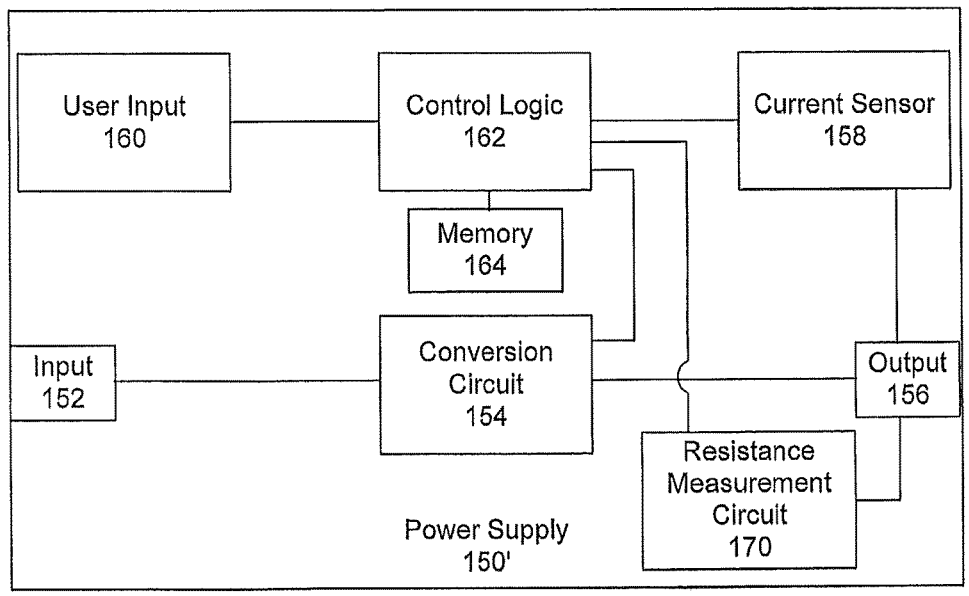
FIG. 5 is a schematic block diagram of a programmable power supply according to further embodiments of the present invention.

In some embodiments, the second power supply 28 of FIG. 3 may further be configured to measure a resistance of the power cable 36. For example, FIG. 5 is a block diagram of a programmable power supply 150' according to further embodiments of the present invention that may be used to implement the power supply 28 of FIG. 3. The power supply 150' is very similar to the power supply 150 of FIG. 4, except that it further includes a cable resistance measurement circuit 170 that may be used to measure a resistance of the power supply cable. The cable resistance measurement circuit 170 may be implemented in a variety of ways. For example, in some embodiments, the cable resistance measurement circuit 170 may transmit a voltage pulse onto the power cable and measure the reflected return pulse (the far end of the power cable may be terminated with a termination having known characteristics). The current of the voltage pulse may be measured, as well as the voltage level of the reflected return pulse. The control logic 162 may then apply Ohm's law to calculate the resistance of the power cable. In other embodiments, at the far end of the power cable the two conductors thereof may be shorted and a voltage pulse may again be transmitted through the power cable. The current level of the pulse and the voltage level of the return pulse may be measured and the control logic 162 may again use these measured values to calculate the resistance of the power cable. In other embodiments, the DC resistance can be measured by transmitting alternating current signals at different frequencies over the power cable and measuring the amplitude and phase shift of these signals at the far end of the cable. The DC resistance may then be calculated using the measured results. Other ways of measuring the resistance of a wire segment are known to those of skill in the art and may be used instead of the example methods listed above.

It will also be appreciated that in other embodiments the resistance measurement circuit 170 may measure an impedance of the power cable and use this measured impedance value to determine the resistance of the power cable. It will also be appreciated that the power supply 150' may alternatively comprise an AC-to-DC converter, similar to power supply 150 discussed above.

Figure 6:
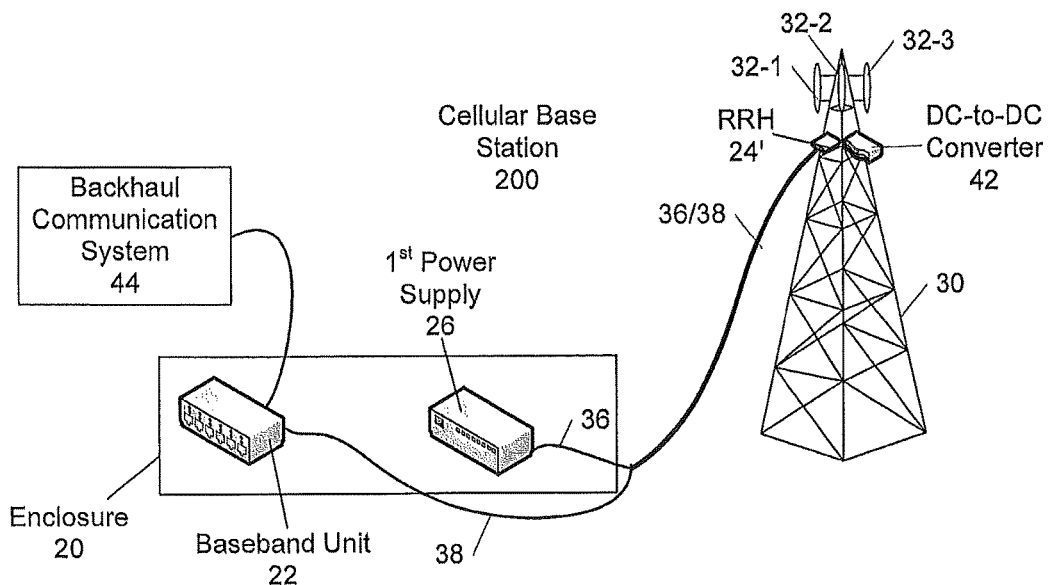
FIG. 6 is a simplified, schematic view of a cellular base station according to still further embodiments of the present invention.

Another technique for reducing the power loss associated with supplying power to a tower-mounted RRH of a cellular base station is to dramatically increase the voltage of the DC power signal fed to the power cable that supplies the DC power signal to the RRH (i.e., well beyond the maximum voltage for the DC power signal that can be handled by the RRH), and then using a tower-mounted DC-to-DC converter power supply to step-down the voltage of the DC power signal to a voltage level that is appropriate for the RRH. As the increased voltage reduces the current necessary to supply the wattage required by the RRH, the power loss along the power cable may be reduced (see Equation 2 above). This is referred to as a "Buck-Boost" scheme where the first DC-to-DC converter at the bottom of the tower is a "Boost" converter that increases the voltage of the DC power signal above the necessary level to operate the RRH and the second DC-to-DC converter at the top of the tower is a "Buck" converter that reduces the voltage of the DC power signal to a desired level. FIG. 6 is a simplified, schematic view of a cellular base station 200 that implements such a technique.

As shown in FIG. 6, the cellular base station 200 is similar to the cellular base station 100 described above with reference to FIG. 3, except that the cellular base station 200 further includes a third power supply 42 in the form of a tower-mounted DC-to-DC converter. In the depicted embodiment, the second power supply 28 of FIG. 3 is omitted, and the first power supply 26 is configured to supply a DC power signal having a voltage that is significantly higher than the maximum voltage for the DC power signal that may be supplied to the RRH 24' (e.g., a 150 volt DC power signal). This high voltage DC power signal may experience significantly less power loss when traversing the power cable 36. The DC-to-DC converter 42 is mounted at the top of the tower 30 between the far end of cable 36 and the RRH 24'. The DC-to-DC converter 42 may be a Buck converter that decreases the voltage of the DC power signal received over the power cable 36 to a voltage level appropriate for supply to the RRH 24'.

Figure 7:
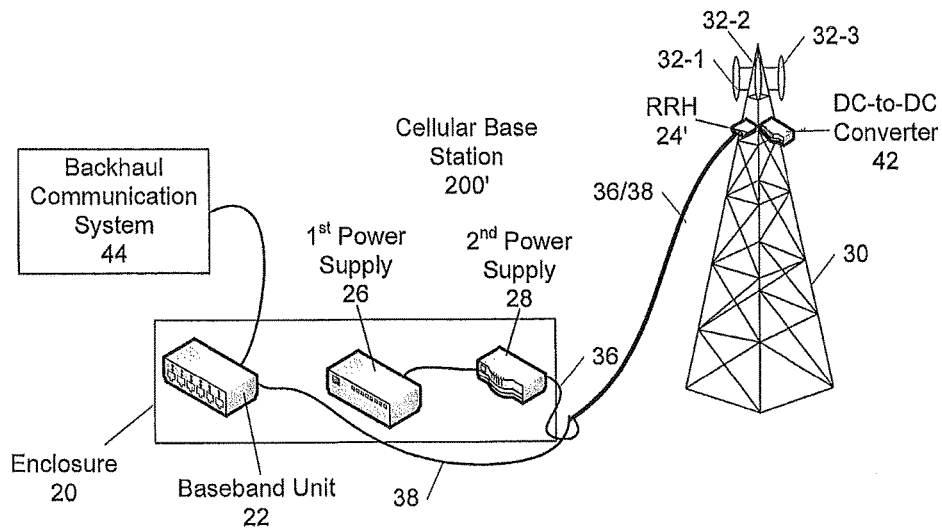
FIG. 7 is a simplified, schematic view of a cellular base station according to yet additional embodiments of the present invention.

As is shown in FIG. 7, in other embodiments, the second power supply 28 may be included in the form of, for example, a DC-to-DC Boost power converter 28 that supplies a high voltage DC power signal (e.g., 150 volts) to the power cable 36. In this embodiment, a DC-to-DC converter is provided at both ends of the power cable 36 so that both of the above-described techniques for reducing power losses in the power cable 36 may be implemented. In particular, the second power supply 28 may output a DC power signal having high voltage (e.g., on the order of 150 volts) that fluctuates with power requirements of the load so that the DC power signal that is supplied at the far end of power cable 36 is set at a relatively constant value. The tower-mounted DC-to-DC converter 42 may be a simple device that down-converts the voltage of the DC power signal by a fixed amount X. The power supply 28 may be programmed to deliver a DC power signal to the tower-mounted DC-to- DC converter 42 that has a voltage level that is set as follows:

$$\text{Voltage of Delivered Power Signal} = V_{RRH\text{-}Max} - V_{margin} + X \quad (4)$$

where $V_{RRH\text{-}Max}$ is the maximum power signal voltage that the RRH 24' is specified to handle, $V_{margin}$ is a predetermined margin (e.g., 2 Volts), and X is the magnitude of the voltage conversion applied by the tower-mounted DC-to-DC converter 42.

One disadvantage of the approaches of FIGS. 6 and 7 is that they require the installation of additional equipment (i.e., the DC-to-DC converter 42) at the top of the tower 30. As the cost associated with sending a technician up a tower may be very high, there is generally a preference to reduce or minimize, where possible, the amount of equipment that is installed at the top of a cellular base station tower, and the equipment that is installed at the top of cellular towers tends to be expensive as it typically is designed to have very low failure rates and maintenance requirements in order to reduce the need for technician trips up the tower to service the equipment. The inclusion of an additional DC-to-DC converter 42 also represents a further increase in capital expenditures, which must be weighed against the anticipated savings in operating costs.

Thus, pursuant to embodiments of the present invention, a DC power signal may be supplied to a tower-mounted RRH (or other equipment) of a cellular base station over a power cable, where the DC power signal that is supplied to the RRH may have a relatively constant voltage level, regardless of the current drawn by the RRH. The voltage level of the DC power signal supplied to the RRH may be set to be at or near a maximum power signal voltage that the RRH can handle, thereby reducing the power loss of the DC power signal. In this manner, the operating costs for the cellular base station may be reduced.

In some embodiments, the programmable power supply according to embodiments of the present invention may comprise a DC-to-DC converter that may be connected between a power supply of an existing base station and the power cable that supplies the power signal to a tower-mounted RRH. Thus, by adding a single piece of equipment at the bottom of the tower, an existing cellular base station may be retrofitted to obtain the power savings available using the techniques according to embodiments of the present invention.

While the above-described embodiments of cellular base stations according to embodiments of the present invention include a first, conventional DC power supply 26 and a second DC-to-DC converter power supply 28, it will be appreciated that in other embodiments these two power supplies may be replaced with a single programmable power supply that may be configured to output a relatively constant voltage at the far end of the power cable 36 in the manner described above.

Figure 8:
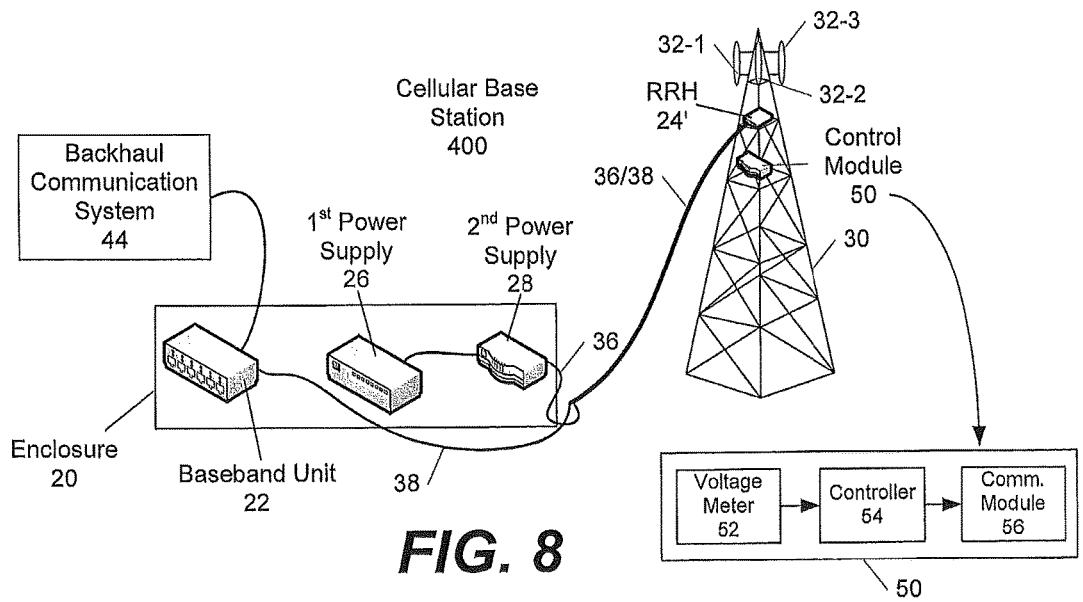
FIG. 8 is a simplified, schematic view of a cellular base station according to yet further embodiments of the present invention.

Pursuant to further embodiments of the present invention, a feedback loop may be used to control the voltage of the DC power signal output by the DC power supply so that the voltage of the DC power signal at the far end of the power cable that connects the power supply and the RRH is maintained at a desired level. FIG. 8 is a simplified, schematic view of one example embodiment of a cellular base station 400 that implements such a technique.

As shown in FIG. 8, the cellular base station 400 is similar to the cellular base station 100 described above with reference to FIG. 3, except that the cellular base station 400 further includes a DC power signal voltage control module 50 that is co-located with the RRH 24'. The DC power signal voltage control module 50 may be located, for example, at or near the top of the tower 30. In an example embodiment, the DC power signal voltage control module 50 may include a voltage meter 52, a controller 54 and a communications module 56. The voltage meter 52 may be used to monitor the voltage of the DC power signal at the far end of the power cable 36 (i.e., at the top of the tower 30). Any appropriate voltage meter may be used that is capable of measuring the voltage of the DC power signal at the far end off cable 36 (or at another location proximate the RRH 24') or that may measure other parameters which may be used to determine the voltage of the DC power signal at the far end off cable 36.

The voltage meter 52 may supply the measured voltage (or other parameter) to the controller 54. The controller 54 may then control the communications module 56 to transmit the measured or calculated voltage of the DC power signal at the far end of power cable 36 to, for example, the second power supply 28. The controller 54 may comprise any appropriate processor, controller, ASIC, logic circuit or the like. The communications module 56 may comprise a wired or wireless transmitter. In some embodiments, the communications module 56 may comprise a wireless Bluetooth transmitter or a cellular transmitter. In other embodiments, the communications module 56 may communicate with the second power supply 28 over a separate wired connection. In still other embodiments, the communications module 56 may communicate with the second power supply 28 by modulating a signal onto the power cable 36. In each case, the communications module 56 may transmit the measured or calculated voltage of the DC power signal at the far end of power cable 36 to the second power supply 28. The second power supply 28 may adjust the voltage of the DC power signal that it outputs in response to these communications in order to generally maintain the voltage of the DC power signal at the far end of power cable 36 at a desired and/or pre-selected level. Thus, in this embodiment, an active feedback loop may be used to maintain the voltage of the DC power signal at the far end of power cable 36 at the pre-selected level.

The power signal voltage control module 50 may be a standalone unit or may be integrated with other equipment such as, for example, the RRH 24'.

While the embodiments that have been described above deliver a DC power signal over the power cable 36, it will be appreciated that in other embodiments, an AC power signal may be used instead. For example, if the RRHs 24' are designed to be powered by an AC power signal as opposed to a DC power signal, then the power supply 28 may output an AC power signal as opposed to a DC power signal, but may otherwise operate in the same fashion. Likewise, in embodiments that include a DC-to-DC converter 42 at the top of the tower 30, an AC-to-DC converter may be used instead or, if the RRH 24' is designed to be powered by an AC power signal, the DC-to-DC converter 42 may be replaced with a Buck AC-to-AC converter. Thus, it will be appreciated that the embodiments illustrated in the figures are exemplary in nature and are not intended to limit the scope of the present invention.

In the various embodiments described above, a single power cable 36 has been provided that connects the power supply 28 to the RRH 24'. It will be appreciated, however, that the cabling connection for the power signal between the power supply 28 and the RRH 24' may include multiple elements such as two or more power cables 36 that are connected by connectors in other embodiments.

Figure 9:
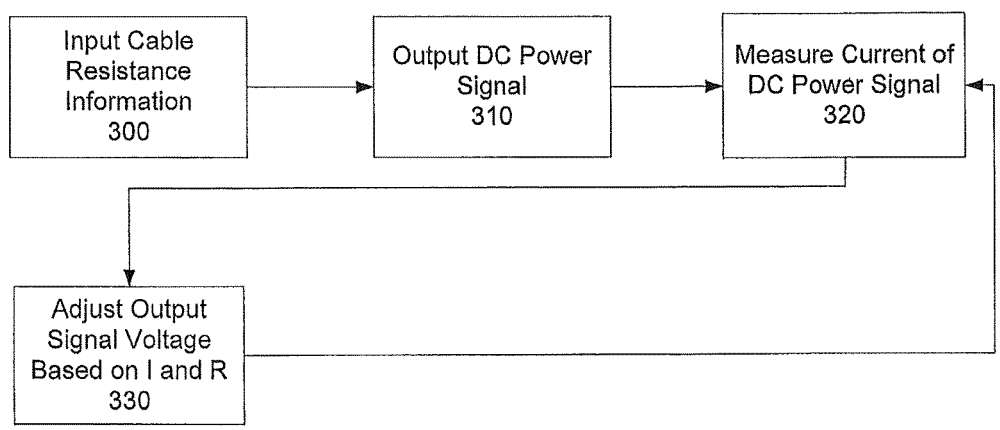
FIG. 9 is a flow chart illustrating operations of methods according to embodiments of the present invention.

A method of powering a radio that is mounted on a tower of a cellular base station according to embodiments of the present invention will now be described with reference to the flow chart of FIG. 9. As shown in FIG. 9, operations may begin with a user inputting information to a programmable power supply which may be used by the programmable power supply to set a voltage level of the power signal that is output by the programmable power supply (block 300). This information may comprise, for example, an electrical resistance of a cabling connection between the power supply and the radio or information regarding the characteristics of the cabling connection that may be used to calculate this resistance. While not shown in FIG. 9, it will be appreciated that in other embodiments the programmable power supply may have the capability to measure the resistance of the cabling connection, thereby avoiding the need for any user input. The programmable power supply may use this information to output a DC power signal that is provided to the radio over the cabling connection (block 310). The current of the DC power signal that is output may then be measured (block 320). The programmable power supply may then automatically adjust a voltage level of the power signal output by the power supply in response to changes in the measured output current so as to provide a substantially constant, preselected voltage at a first end of the power cable that is remote from the power supply (block 330). As shown in FIG. 9, blocks 320 and 330 are then performed continuously at appropriate intervals in order to maintain the voltage level of the signal output of the power supply at the far end of the power cable at the preselected voltage level.

Embodiments of the present invention provide power supplies for powering radio equipment such as a remote radio head that is located remote from the power supply used to power the radio (e.g., the power supply is at the base of a cellular tower and the radio is at the top of the tower) without receiving any feedback from the radio or from other equipment at the remote location. The voltage of the DC power signal supplied by the power supply to the radio over a cabling connection may be set at a pre-selected level. The pre-selected level may be set to reduce or minimize power losses that may be incurred in transmitting the DC power signal over the cabling connection. The voltage of the DC power signal output by the power supply may be varied based on variations in the current drawn from the power supply so that the voltage of the DC power signal at the radio end of the cabling connection may have, for example, a substantially constant value. This value may be selected to be near a maximum value for the voltage of the DC power signal that may be input to the radio.

While typically the voltage of the DC power signal output by the power supply will be adjusted to maintain the voltage of the DC power signal at the radio end of the cabling connection at a set level, it will be appreciated that some variation is to be expected because of the time it takes the DC power supply to adjust the voltage of the DC power signal in response to changes in the current drawn. It will also be appreciated that the voltage of the DC power signal need not be maintained at a constant level at the radio end of the cabling connection but, may instead have different characteristics (e.g., set to be maintained within a predetermined range, set to return to a pre-selected level within a certain time period, etc.) in some embodiments.

In some current cellular systems, the voltage drop that occurs on the DC power signal that is delivered from a power supply located at the bottom of a cellular tower to the RRH at the top of the tower may be so large that the voltage of the DC power signal at the top of the tower may be insufficient to run the RRH. As a result, larger diameter power cables are used in some cases that exhibit less DC resistance and hence a smaller voltage drop. However, the use of larger power cables has a number of disadvantages, as these cables can be significantly more expensive, add more weight to the tower (requiring that the towers be constructed to handle this additional weight) and more difficult to install.

Pursuant to embodiments of the present invention, this problem may be reduced or solved by controlling the voltage of the DC power signal output by the power supply so that the voltage of the DC power signal at the radio end of the cabling connection may be at or near a maximum voltage for the DC power signal that may be input to the RRH. This scheme reduces the voltage drop of the DC power signal, and hence may allow for the use of smaller diameter power cables and/or longer cabling connections between the power supply and the RRH. Additionally, as noted above, as the power losses experienced by the DC power signal are less, the costs of operating the RRH may also be reduced.

The present invention has been described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. Like numbers refer to like elements throughout the specification and drawings. It will also be appreciated that the embodiments disclosed above can be combined in any way and/or combination to provide many additional embodiments.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

In the drawings and specification, there have been disclosed typical embodiments of the invention and, although specific terms are employed, they are used in a generic and That which is claimed is:

1. A system, comprising:
   a first power supply configured to generate a first DC power;
   a second power supply coupled to the first power supply, and configured to receive the first DC power and to generate an output voltage at an output which is coupled to a power cable;
   wherein the second power supply has an input configured to receive a first signal derived from a measurement by a measurement circuit;
   wherein the power cable, having a first conductor and a second conductor, is coupled between the second power supply and at least one remote radio head, where the at least one remote radio head is coupled to the measurement circuit, and where the measurement circuit and the at least one remote radio head are mounted on a mounting structure; and
   wherein the second power supply is configured to use the first signal to determine a level of the output voltage of the second power supply that maintains the voltage proximate to the at least one remote radio head at a constant level or within a range.

2. The system of claim 1, wherein the level of the output voltage of the second power supply maintains the voltage proximate to the at least one remote radio head at the constant level or within the range so as to reduce power loss in the power cable.

3. The system of claim 1, wherein the second power supply is configured to use the first signal to determine the level of the output voltage of the second power supply comprises the second power supply is configured to have its output voltage adjusted in response to the first signal.

4. The system of claim 1, wherein
   the second power supply comprises a DC-to-DC converter that is configured to output a voltage in response to the first signal.

5. The system of claim 4, wherein the DC-to-DC converter comprises:
   a voltage conversion circuit configured to convert a voltage of the first DC power signal to a different voltage; and
   control circuitry that is configured to adjust parameters of the conversion circuit to convert a voltage of the first DC power signal to a different voltage.

6. The system of claim 5, wherein the DC-to-DC converter further comprises a current sensor coupled to the control circuitry.

7. The system of claim 1, wherein the input is configured to be coupled to the measurement circuit by at least one wire.

8. The system of claim 1, wherein the measurement circuit comprises a voltage meter.

9. An equipment enclosure, comprising:
   an enclosure;
   a first power supply, in the enclosure, configured to generate a first DC power;
   a second power supply, in the enclosure, coupled to the first power supply, and configured to receive the first DC power and to generate an output voltage at an output which is coupled to a power cable;
   wherein the second power supply has an input configured to receive a first signal derived from a measurement by a measurement circuit;
   wherein the power cable, having a first conductor and a second conductor, is coupled between the second power supply and at least one remote radio head, where the at least one remote radio head is coupled to the measurement circuit, and where the measurement circuit and the at least one remote radio head are mounted on a mounting structure; and
   wherein the second power supply is configured to use the first signal to determine a level of the output voltage of the second power supply that maintains the voltage proximate to the at least one remote radio head at a constant level or within a range.

10. The equipment enclosure of claim 9, wherein the level of the output voltage of the second power supply maintains the voltage proximate to the at least one remote radio head at the constant level or within the range so as to reduce power loss in the power cable.

11. The equipment enclosure of claim 9, wherein the second power supply is configured to use the first signal to determine the level of the output voltage of the second power supply comprises the second power supply is configured to have its output voltage adjusted in response to the first signal.

12. The equipment enclosure of claim 9, wherein
   the second power supply comprises a DC-to-DC converter that is configured to output a voltage in response to the first signal.

13. The equipment enclosure of claim 12, wherein the DC-to-DC converter comprises:
   a voltage conversion circuit configured to convert a voltage of the first DC power signal to a different voltage; and
   control circuitry that is configured to adjust parameters of the conversion circuit to convert a voltage of the first DC power signal to a different voltage.

14. The equipment enclosure of claim 9, wherein the input is configured to be coupled to the measurement circuit by at least one wire.

15. The equipment enclosure of claim 9, wherein the measurement circuit comprises a voltage meter.

16. The equipment enclosure of claim 9, further comprising a baseband unit in the enclosure.

17. A method, comprising:
   generating DC power in a first power supply;
   providing the DC power to a second power supply;
   receiving, from a measurement circuit, at least one parameter measured at a first end of a power cable proximate to at least one remote radio head coupled to the first end of the power cable;
   using the at least one parameter, determining a voltage level of an output of the second power supply, coupled to the second end of the power cable, that maintains the voltage at the first end at a constant level or within a range; and
   providing the determined voltage level at the output of the second power supply.

18. The method of claim 17, wherein maintaining the voltage at the first end at the constant level or within the range comprises maintaining the voltage at the first end at a constant level or within the range so as to reduce power loss in the power cable.

19. The method of claim 17, wherein using the at least one parameter, determining the voltage level of the output of the second power supply comprises adjusting the voltage level of the output in response to the received at least one parameter.

20. The method of claim 17, wherein receiving, from a measurement circuit, the at least one parameter comprises receiving, from a measurement circuit, the at least one parameter at an input of the second power supply.

21. The method of claim 20, wherein receiving, from a measurement circuit, the at least one parameter at the input of the second power supply comprises receiving, from a measurement circuit, the at least one parameter from a measurement circuit by at least one wire coupled to the input of the second power supply.

22. The method of claim 17, wherein receiving, from a measurement circuit, the at least one parameter comprises receiving, from a voltage meter, the at least one parameter.

23. The method of claim 17, wherein using the at least one parameter, determining the level of the output voltage of the second power supply comprises using the at least one parameter, determining a voltage level of an output of a DC-to-DC converter, where the second power supply comprises the DC-to-DC converter.

24. The method of claim 17, wherein receiving the at least one parameter comprises receiving at least one voltage level.

25. A method, comprising:
  receiving at least one voltage level (a) from a measurement circuit by at least one wire coupled to an input of a power supply including a power supply coupled to a DC-to-DC converter, and (b) measured at a first end of a power cable proximate to at least one remote radio head coupled to the first end of the power cable;
  wherein the power supply is configured to generate a DC voltage, and the DC-to-DC converter is configured to receive the DC voltage; and
  using the at least one voltage level, determining a voltage level of an output of the DC-to-DC converter, coupled to the second end of the power cable, that maintains the voltage at the first end at a constant level or within a range.

26. The method of claim 25, wherein maintaining the voltage at the first end at the constant level or within the range comprises maintaining the voltage at the first end at a constant level or within the range so as to reduce power loss in the power cable.

27. The method of claim 25, wherein using the at least one voltage level, determining the voltage level of the output of the DC-to-DC converter comprises adjusting the voltage level in response to the received at least one voltage level.

28. The method of claim 25, wherein receiving at least one voltage level (a) from the measurement device by the at least one wire coupled to the input of the power supply including the power supply coupled to the DC-to-DC converter comprises receiving at least one voltage level (a) from the measurement device by the at least one wire coupled to an input of the DC-to-DC converter.

* * * * *